United States Patent
Dingert et al.

(10) Patent No.: US 11,357,382 B2
(45) Date of Patent: Jun. 14, 2022

(54) BUCKET AND CLEANING SYSTEM WHICH COMPRISES SUCH A BUCKET

(71) Applicant: Carl Freudenberg KG, Weinheim (DE)

(72) Inventors: Uwe Dingert, Abtsteinach (DE); Norbert Weis, Weinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 17/258,461

(22) PCT Filed: Jul. 1, 2019

(86) PCT No.: PCT/EP2019/067553
§ 371 (c)(1),
(2) Date: Jan. 7, 2021

(87) PCT Pub. No.: WO2020/011579
PCT Pub. Date: Jan. 16, 2020

(65) Prior Publication Data
US 2021/0282619 A1    Sep. 16, 2021

(30) Foreign Application Priority Data
Jul. 11, 2018    (DE) .............. 10 2018 116 774.1

(51) Int. Cl.
*A47L 13/58*    (2006.01)
*B01D 29/96*    (2006.01)
*B01D 35/153*    (2006.01)

(52) U.S. Cl.
CPC .............. *A47L 13/58* (2013.01); *B01D 29/96* (2013.01); *B01D 35/153* (2013.01)

(58) Field of Classification Search
CPC .......... A47L 13/22; A47L 13/26; A47L 13/50; A47L 13/58; A47L 11/4013; A47L 11/4016; A47L 11/4025; A47L 11/4027
USPC ............................... 134/104.4, 109, 110, 111
See application file for complete search history.

(56) References Cited

U.S. PATENT DOCUMENTS

| 2012/0047675 A1* | 3/2012 | Chu .................. A47L 13/58 15/260 |
| 2016/0051118 A1 | 2/2016 | Zhou |
| 2018/0279849 A1 | 10/2018 | Dingert |

FOREIGN PATENT DOCUMENTS

| CN | 102100514 A | 6/2011 |
| CN | 103445735 A | 12/2013 |
| DE | 202013008608 U1 | 10/2013 |
| WO | WO 2014180341 A1 | 11/2014 |

* cited by examiner

*Primary Examiner* — Benjamin M Kurtz
(74) *Attorney, Agent, or Firm* — Leydig, Voit & Mayer, Ltd.

(57) ABSTRACT

A bucket includes: at least two chambers which are flow connected to one another by at least one overflow channel. One of the chambers is a combined washing-out/centrifuging chamber for a cleaning device. One of the chambers is a water level-regulating chamber configured to regulate a water level in the washing-out/centrifuging chamber. The water level-regulating chamber contains a displacement body which is movable by a first actuating device.

22 Claims, 7 Drawing Sheets

BUCKET AND CLEANING SYSTEM WHICH COMPRISES SUCH A BUCKET

CROSS-REFERENCE TO PRIOR APPLICATIONS

This application is a U.S. National Phase application under 35 U.S.C. § 371 of International Application No. PCT/EP2019/067553, filed on Jul. 1, 2019, and claims benefit to German Patent Application No. DE 10 2018 116 774.1, filed on Jul. 11, 2018. The International Application was published in German on Jan. 16, 2020 as WO 2020/011579 under PCT Article 21(2).

FIELD

The invention relates to a bucket and a cleaning system which comprises such a bucket.

BACKGROUND

A bucket and a cleaning system which comprises such a bucket are generally known.

The bucket comprises only one chamber. The chamber can be filled with water.

In this specification, "water" is understood to mean a cleaning fluid in the broadest sense.

For example, water with a cleaning additive in liquid or powder form, or even a synthetically produced cleaning fluid.

A change in the water level in the bucket may be made by the user in that they fill water into or empty it from the bucket as required.

Depending on the degree of contamination of the surface previously cleaned with the cleaning device, the water located in the bucket is also contaminated accordingly. Given severe contamination of the surfaces to be cleaned, and resulting therefrom of the cleaning device, the water in the bucket must be changed frequently.

If the cleaning device, which in addition to the bucket forms part of the cleaning system, is not only to be washed out but also centrifuged, this may take place in a separately formed centrifuging chamber of the bucket, for example in a centrifuging basket arranged in the centrifuging chamber, which can be set into rotary motion together with the cleaning device by means of a drive. Such a bucket thus then has two chambers which are spatially separate from one another.

It is thereby to be noted that the user must always move the cleaning device in the bucket as needed from the washing-out chamber into the centrifuging chamber of said bucket, wherein the washing-out chamber is always filled with water, by contrast to which the centrifuging chamber is always essentially dry.

SUMMARY

In an embodiment, the present invention provides a bucket, comprising: at least two chambers which are flow connected to one another by at least one overflow channel, wherein one of the chambers comprises a combined washing-out/centrifuging chamber for a cleaning device, wherein one of the chambers comprises a water level-regulating chamber configured to regulate a water level in the washing-out/centrifuging chamber, and wherein the water level-regulating chamber contains a displacement body which is movable by a first actuating device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
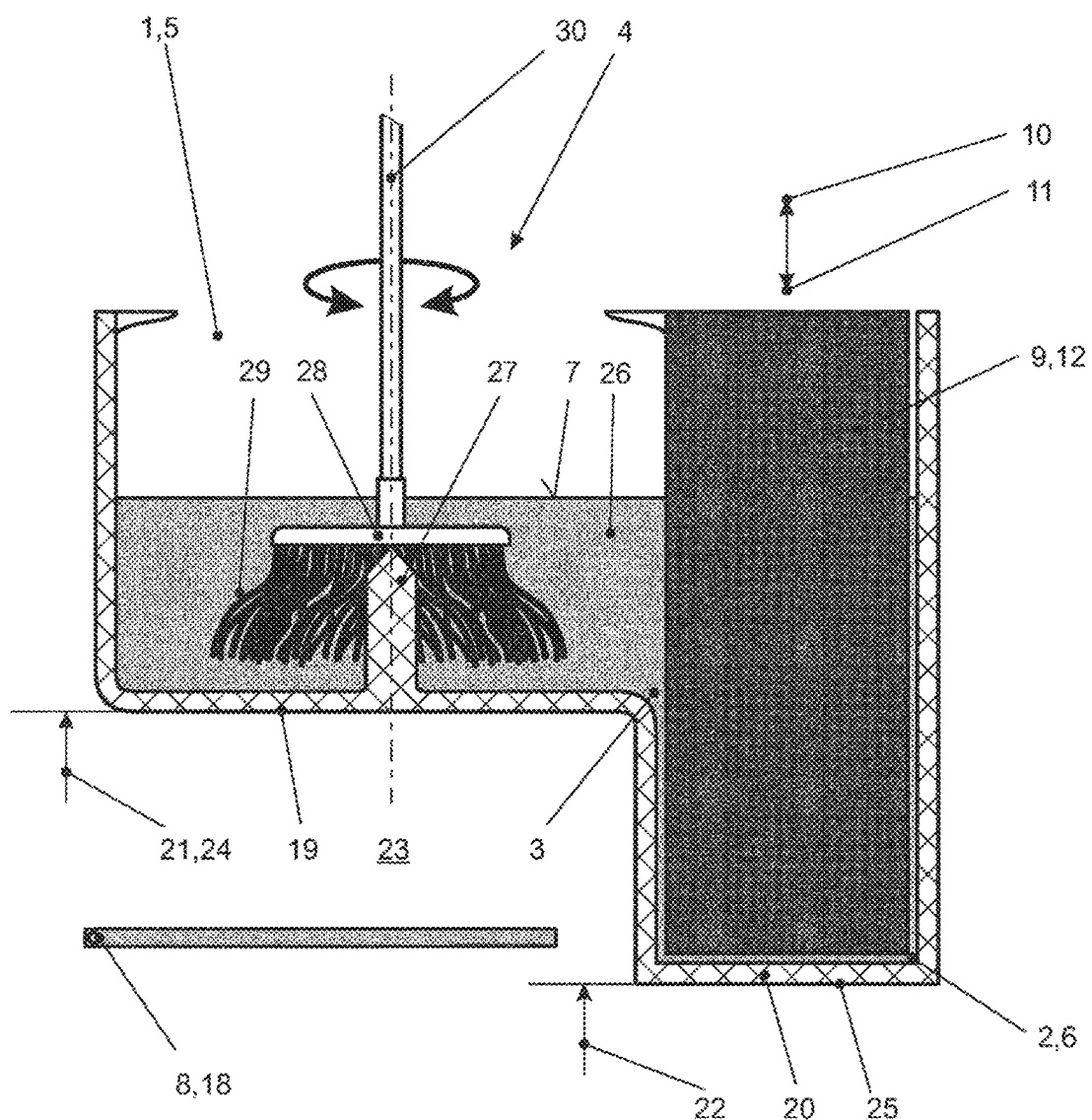
FIG. 1 shows a first exemplary embodiment of the cleaning system in accordance with the invention, which comprises the bucket in accordance with the invention, in section view, wherein the combined washing-out/centrifuging chamber is filled with water to the maximum.

In an embodiment, the present invention provides a bucket and a cleaning system comprising such a bucket in such a manner that the handling of bucket and cleaning system is simplified for the user without any functional disadvantages.

In an embodiment, the present invention provides a bucket is provided comprising at least two chambers which are connected to one another in terms of flow by at least one overflow channel, wherein one of the chambers is designed as a combined washing-out/centrifuging chamber for a cleaning device and one of the chambers is designed as a water level-regulating chamber for regulating the water level in the washing-out/centrifuging chamber, wherein a displacement body which can be moved by a first actuating device is arranged in the water level-regulating chamber.

The chambers are connected to one another in terms of flow by the overflow channel.

In order to be able to either wash out or centrifuge a cleaning device as needed in a total of only one chamber of a bucket, it is necessary that the water level in such chamber may be adapted as needed to the respective washing-out or centrifuging operation.

If the cleaning device is first to be washed out after cleaning of a surface to be cleaned, it is necessary that sufficient water be available for this in the chamber; the water level must be sufficiently high for washing out the cleaning device.

By contrast, if the previously washed-out cleaning device is subsequently to be centrifuged in the same chamber, it is necessary that the chamber then be essentially free of water. For this purpose, the water level in the chamber must be correspondingly lowered.

The height of the water level in the bucket is regulated by means of the displacement body movable by the first actuating device, wherein the displacement body is arranged in the water level-regulating chamber.

The following statements apply to the function:

If, for example, the cleaning device is to be washed out in the bucket after cleaning of a surface to be cleaned and a centrifuge is subsequently to take place, the displacement body is at least partially, preferably completely, lowered by actuating the first actuating device in the water level-regulating chamber, in order to displace the water located in the water level-regulating chamber through the overflow channel into the combined washing-out/centrifuging chamber. The combined washing-out/centrifuging chamber is thereby filled sufficiently high with water, and the cleaning device can be washed out therein.

After the cleaning device has been washed out, the displacement body is at least partially, preferably completely, moved out of the water level-regulating chamber such that the water previously located in the washing-out/centrifuging chamber flows back again into the water level-regulating chamber through the overflow channel. The combined washing-out/centrifuging chamber is subsequently essentially dry, such that the cleaning device can now be centrifuged in the same chamber in which it was previously washed out.

The centrifuging may take place by means of a suitable centrifuging device, for example by means of a centrifuging basket arranged in the washing-out/centrifuging chamber, into which the cleaning device is inserted and set into rotation together with said centrifuging basket.

The cleaning device may remain in one and the same chamber of the bucket for washing out and for centrifuging. Handling is thereby simplified.

Considered in a plan view of the bucket, the washing-out/centrifuging chamber and the water level-regulating chamber are arranged lying essentially side by side. It is hereby advantageous that the bucket thereby has a simple design and can be produced simply in terms of its manufacturing and cost-effectively in terms of economics.

The washing-out/centrifuging chamber and the water level-regulating chamber function in the manner of communicating tubes via the overflow channel connecting them to one another in terms of flow.

The displacement body can be movable up and down within the water level-regulating chamber via the first actuating device. The water level in the bucket can thereby be simply and precisely adapted to the respective needs of the respective use case.

The transmission of a translatory movement of the first actuating device to a translatory movement of the displacement body may be simply achieved in terms of structure, for example in that the first actuating device is formed by a foot pedal which sets the displacement body into the up and down movement by means of a linkage.

The displacement body may be of different design.

For example, the displacement body may be designed as a hollow body. It is hereby advantageous that the displacement body itself has only a low weight and, in the water level-regulating chamber, has a high buoyancy in the lowered state. Such a displacement body may automatically ensure, without actuation of the first actuating device, that the displacement body floats up if the first actuating device is not actuated. The washing-out/centrifuging chamber is thereby automatically drained if the first actuating device is not actuated.

The displacement body may be formed in a bell shape. It is hereby advantageous that the displacement body can thereby be produced simply and cost-effectively.

The displacement body is preferably designed to be removable from the bucket. The bucket can thereby be easily cleaned as required.

The displacement body may consist of a polymeric material. Displacement bodies made of such a material have the advantage that they are resistant to all typical cleaning fluids and moreover are corrosion-resistant.

According to another embodiment, the displacement body may have a variable displacement volume. For this purpose, it may be provided that the displacement volume is connected in terms of flow to the water level-regulating chamber and is variable in volume via actuation of an evacuation device.

In such an embodiment, the first actuating device is formed by the evacuation device.

A displacement body with a variable displacement volume may be largely filled with water from the water level-regulating chamber, for example given an essentially dry washing-out/centrifuging chamber. If, by contrast, the washing-out/centrifuging chamber is to be filled with water from the water level-regulating chamber, the water located in the displacement body is displaced from the displacement body via actuation of the evacuation device and is moved through the overflow channel into the washing-out/centrifuging chamber. The evacuation device may, for example, function in the manner of a bellows and can be actuated by foot force.

According to an advantageous embodiment, it may be provided that a fluid filter is arranged in the overflow channel.

The fluid filter can preferably be traversed in only one flow direction, namely from the water level-regulating chamber to the washing-out/centrifuging chamber.

For this purpose, the fluid filter may be designed in the manner of a non-return valve in such a manner that fluid can flow around the fluid filter counter to the flow direction, namely from the washing-out/centrifuging chamber to the water level-regulating chamber.

The arrangement of a fluid filter in the overflow channel between the washing-out/centrifuging chamber and the water level-regulating chamber is advantageous in several respects, as stated below:

If the cleaning device contaminated by its use is first washed out in the combined washing-out/centrifuging chamber, impurities pass from the cleaning device into the water that is located in the washing-out/centrifuging chamber for washing out the cleaning device.

To subsequently centrifuge the cleaning device, the displacement body is moved upwards in the water level-regulating chamber, and the contaminated water from the washing-out/centrifuging chamber flows unfiltered past the fluid filter into the water level-regulating chamber.

The impurities are still located as before in the contaminated water, and now in the water level-regulating chamber, and the washing-out/centrifuging chamber is largely dry and free of impurities in order to centrifuge the cleaning device.

If the cleaning device is to be washed out again in the washing-out/centrifuging chamber after a further cleaning cycle, the displacement body is lowered into the water level-regulating chamber by means of the first actuating device, and the initially still contaminated water from this chamber is moved through the fluid filter into the washing-out/centrifuging chamber. The impurities previously present in the water level-regulating chamber are retained therein by the fluid filter. Thus, only water filtered by the fluid filter passes into the washing-out/centrifuging chamber. The cleaning device may thereby be washed out frequently and effectively with largely clean water as needed. Via the filtering of the water, the water in the bucket needs to be changed only rarely.

What is meant by "in the overflow channel" is generally an arrangement of the fluid filter in the flow path between the washing-out/centrifuging chamber and the water level-regulating chamber. For the function of the fluid filter, it is practically irrelevant whether this is arranged in the region of the front-side ends of the overflow channel or between such front-side ends; it is important only that the overflow channel is designed to be very short, for example in the form of a diaphragm, in order to keep the dimensions of the bucket as compact as possible.

The fluid filter may be arranged in a flap that is arranged so as to be pivotable in the overflow channel.

This also includes an embodiment given which the fluid filter itself is designed as a pivotable flap.

A pivotable flap in the overflow channel may be provided simply and cost-effectively, wherein such a flap is easily accessible to the user of the bucket and can be washed out and/or replaced as needed. For example, the fluid filter can initially be washed out after a certain period of use in order to regain the original good filtering effect. If such filtering effect is no longer achievable by cleaning the fluid filter, the possibility exists for the user to replace the fluid filter simply by exchanging it.

According to a first embodiment, the fluid filter can be automatically moved due to the flow conditions in the overflow channel. Such an actuation of the fluid filter is particularly simple in terms of design. The user does not need to attend to the actuation of the fluid filter.

According to another embodiment, the fluid filter can be actuated by a second actuating device. The second actuating device is actuated by the user.

In order to simplify the coordination of the first and second actuating devices for the user, said first and the second actuating device may preferably be functionally coupled and can thereby be actuated simultaneously. The joint actuation of the two actuating devices results in a forced control for the fluid filter depending on the up and down movement of the displacement body.

A faulty operation, which could lead to a functional impairment of the previously described workflows, is thereby ruled out in practice.

For a good handling of the bucket, and thus of the cleaning system comprising such a bucket, it is expedient that the bucket has dimensions as compact as possible and may also be transported, without excessive exertion of force, in the state in which it is filled with water.

For this reason, the bucket should have a water volume that is sufficient to wash out the cleaning device but is not significantly greater, so as not unnecessarily hinder the handling of the bucket.

In order to achieve this, according to an advantageous embodiment it may be provided that the washing-out/centrifuging chamber comprises a first floor and the water level-regulating chamber comprises a second floor, that the floors are arranged at different heights in the bucket, and that the first floor is arranged above the second floor.

The floors are accordingly arranged offset relative to one another in a stepped manner, if the bucket is viewed in section. It is hereby advantageous that the water volume in the bucket may be reduced to a minimum via the stepped arrangement. Due to the relatively higher first floor of the washing-out/centrifuging chamber, a comparatively small water volume in the water level-regulating chamber, displaced by the actuated displacement body, is sufficient to be able to fill the washing-out/centrifuging chamber sufficiently high and to be able to wash out the cleaning device.

Due to the low water volume, the bucket is comparatively light even in the ready-to-use state.

The first floor arranged higher in the bucket moreover has the advantage that an installation space within the external dimensions of the bucket is thereby formed below this first floor, wherein preferably at least the first actuating device is arranged in the installation space.

The installation space may moreover be used for arranging the second actuating device, or for arranging a combined actuating device comprising the first and second actuating devices.

A foot pedal via which the displacement body and/or the fluid filter can be actuated may be arranged in the installation space.

The first floor may be arranged essentially at half the height of the bucket. Such an arrangement is advantageous because, on the one hand, a good function of the bucket, as described above, is thereby ensured. On the other hand, a sufficiently large installation space is present for at least one actuating device.

The second floor may form part of the contact area of the bucket.

A further component of the contact area may be formed by the actuating device connected to the bucket in the installation space.

The volume of water moved in the bucket may be from 2 liters to 5 liters. Such a volume of water has proven to be advantageous because, on the one hand, the workflows described above thereby function properly and, on the other hand, the filled bucket can be handled without problems even by users who are less strong.

The water level in the washing-out/centrifuging chamber may amount to 0 to 80 mm above the first floor during the intended use of the bucket. This water level, which can be varied by actuating the displacement body, is sufficiently large to be able to thoroughly wash out even severely contaminated cleaning devices, and moreover is small enough to achieve a good handling of the bucket with as small a moving volume of water as possible.

During the intended use of the bucket, the water level may be 0 mm if the displacement body is not actuated by the first actuating device and a maximum of 80 mm if the displacement body is actuated by the first actuating device.

A receptacle for the cleaning device for washing out or centrifuging said cleaning device may be arranged in the washing-out/centrifuging chamber. Such a receptacle may, for example, be formed by a mandrel onto which the cleaning device may be placed, which cleaning device is designed as a mop, for example.

As already stated above, the invention moreover relates to a cleaning system comprising a bucket and a cleaning device, as described above.

A first exemplary embodiment of the cleaning system in accordance with the invention and of the bucket in accordance with the invention are shown in FIGS. 1 to 5.

Figure 6:
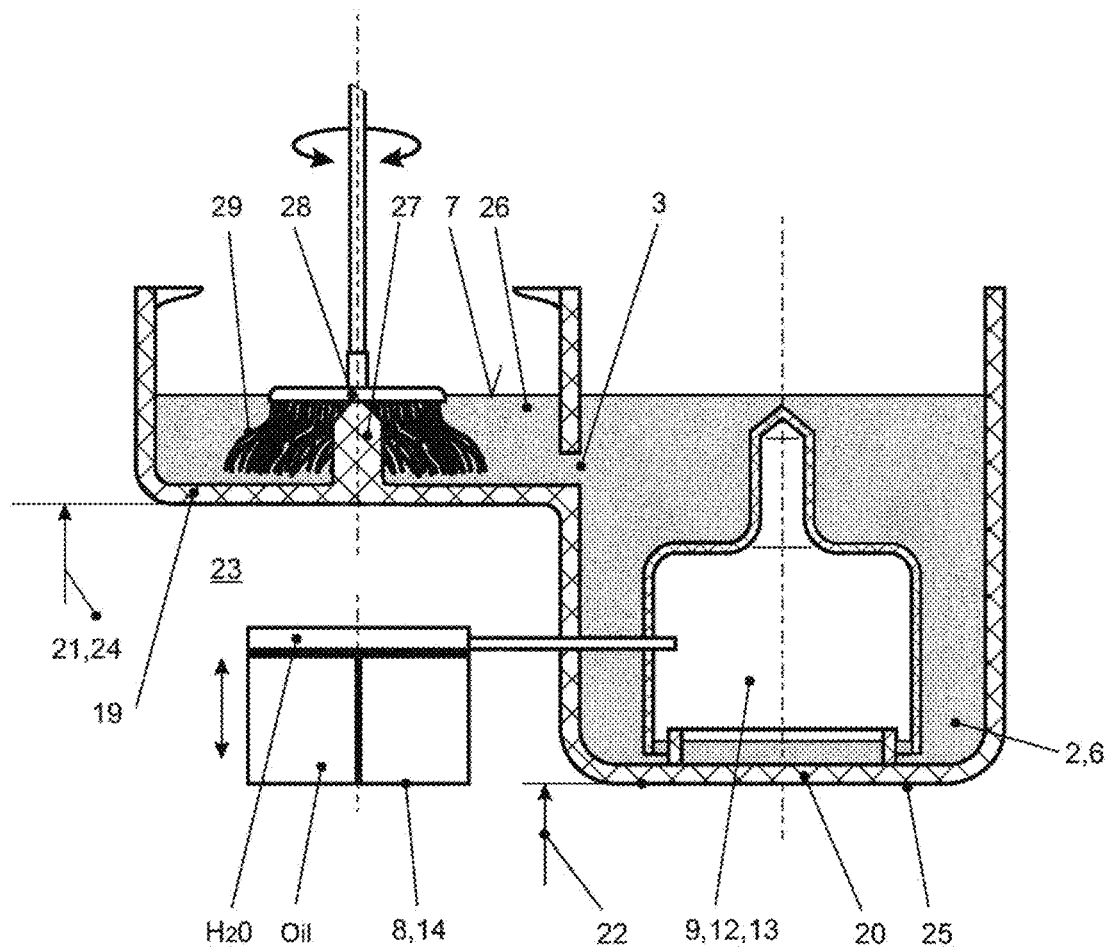
FIG. 6 shows a second exemplary embodiment, similar to the exemplary embodiment from FIG. 1.
Figure 7:
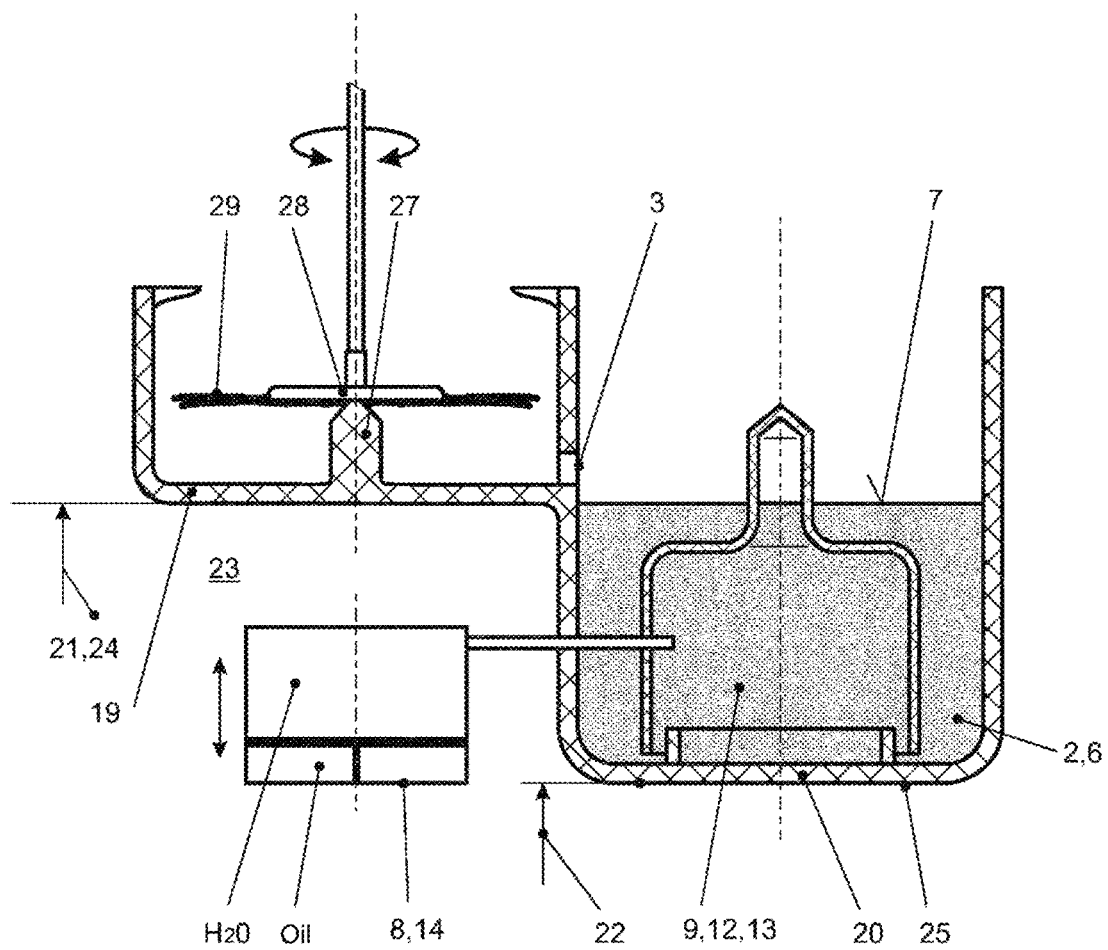
FIG. 7 shows the second exemplary embodiment from FIG. 6 in a presentation similar to FIG. 2.

A second exemplary embodiment of the cleaning system in accordance with the invention and of the bucket in accordance with the invention is shown in FIGS. 6 and 7.

The two exemplary embodiments differ essentially by the configuration of the water level-regulating chamber 6, the displacement body 9 movable therein on 10 and from 11, and by the first actuating device 8.

In both embodiments, a cleaning system that comprises the bucket and a cleaning device 4 is shown. In the exemplary embodiments shown here, the cleaning device 4 is designed as a mop, comprises a mop head 28 to which fringes 29 made of a textile material are fixed, and the mop head 28 is connected to a device handle 30.

The bucket used comprises the two respective chambers 1, 2, which are connected to one another in terms of flow by the overflow channel 3. The first chamber 1 is designed as a combined washing-out/centrifuging chamber 5. In this first chamber 1, the cleaning device 4 may, first be washed out and subsequently centrifuged, as will be explained later.

The second chamber 2 is designed as a water level-regulating chamber 6 for regulating the water level 7 in the washing-out/centrifuging chamber 5. A displacement body 9 movable to 10 and from 11 via the first actuating device 8 is arranged in the water level-regulating chamber 6.

In FIGS. 1 to 5, the displacement body 9 is designed as a hollow body 12 and is essentially bell-shaped.

The bucket is formed stepped, wherein the floors 19, 20 of the washing-out/centrifuging chamber 5 and of the water level-regulating chamber 6 are arranged offset relative to one another in a stepped manner.

The installation space 23 for at least the first actuating device 8 is formed below the washing-out/centrifuging chamber 5 via the first floor 19 arranged higher than the second floor 20, which first actuating device 8 is designed as a foot pedal in the exemplary embodiment shown here.

The upper boundary of the installation space 23 is formed by the first floor 19, which is arranged essentially at half the height 24 of the bucket. Sufficient space thereby remains for the user to actuate the first actuating device 8.

For the simplest possible handling, the first actuating device 8 and the second actuating device 18 are functionally coupled in the exemplary embodiment shown here.

The second actuating device 18 is provided for actuating the fluid filter 15 designed as a flap 17. The fluid filter 15 can only be flowed through in the flow direction 16, from the water level-regulating chamber 6 to the washing-out/centrifuging chamber 5; by contrast, in the opposite direction, flow from the washing-out/centrifuging chamber 5 to the water level-regulating chamber 6 bypasses the fluid filter 15 without any function.

FIG. 1 shows a first operating state of the bucket.

Cleaning has previously taken place with the cleaning device 4, and the cleaning device 4 is now to be washed out in the combined washing-out/centrifuging chamber 5.

In order to have sufficient water available for washing out the cleaning device 4 in the combined washing-out/centrifuging chamber 5, the first actuating device 8 was actuated by the user, and the displacement body 9 was thereby moved in a downward movement 11 into the water level-regulating chamber 6.

The water present in the water level-regulating chamber 6 was largely displaced by the displacement body 9 and moved through the overflow channel 3 into the combined washing-out/centrifuging chamber 5.

Flow thereby passed through the fluid filter 15 that is arranged in the flap 17. Impurities that were previously located in the water in the water level-regulating chamber 6 were thereby filtered out.

The water now located in the washing-out/centrifuging chamber 5 is therefore largely free of impurities.

The cleaning device 4 may now be washed out in the filtered water of the washing-out/centrifuging chamber 5.

The cleaning device 4 in the combined washing-out/centrifuging chamber 5 is to be centrifuged in order to be able to be used again.

Figure 2:
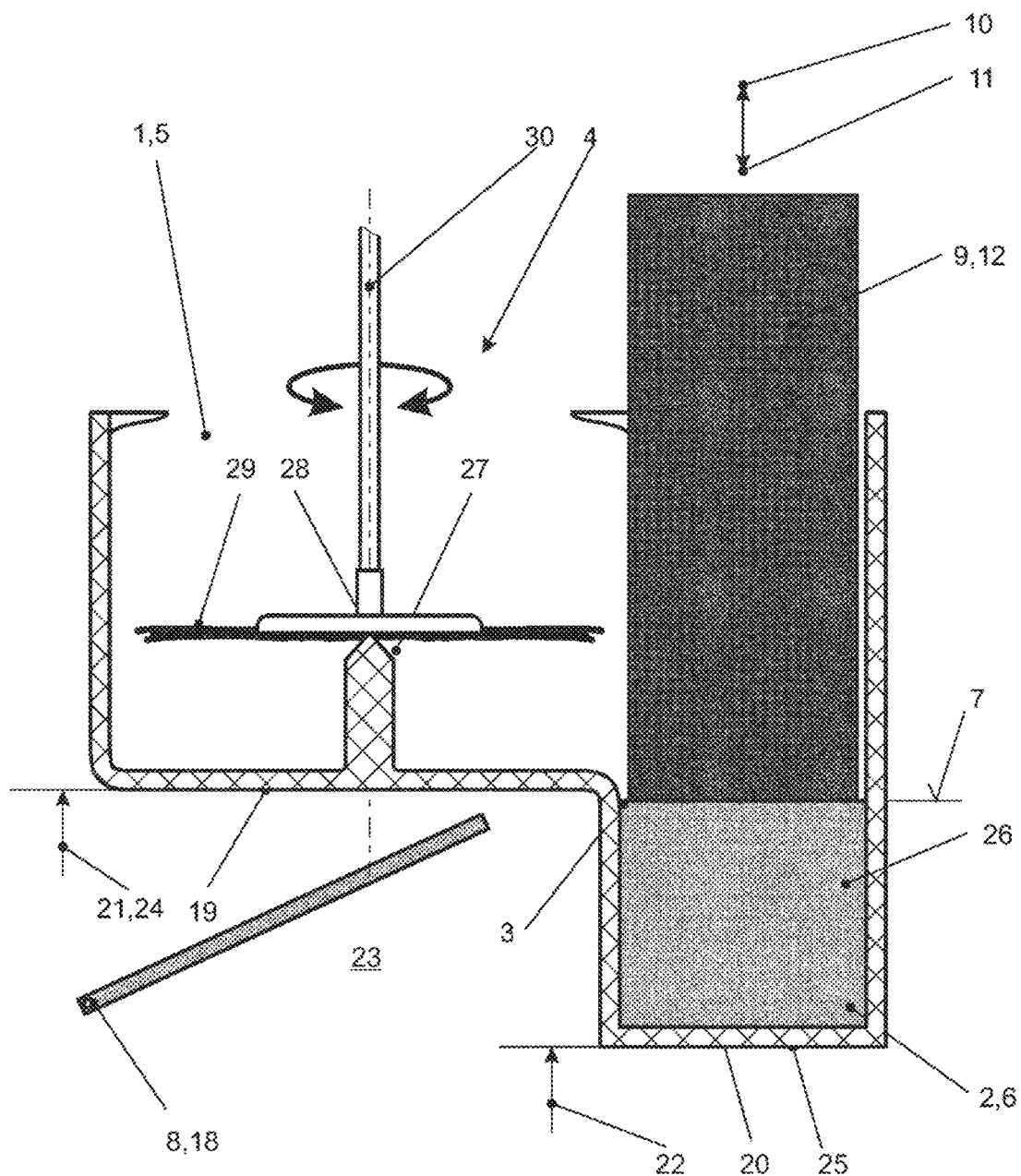
FIG. 2 shows the exemplary embodiment from FIG. 1 in another operating state. The combined washing-out/centrifuging chamber is essentially dry.

In FIG. 2 it is shown that the first actuating device 8 has automatically moved back into its starting position due to the buoyancy of the hollow displacement body 9 in the water level-regulating chamber 6. The water flows back from the combined washing-out/centrifuging chamber 5, through the overflow channel 3, into the water level-regulating chamber 6 to the same extent that the displacement body 9 floats up in the water level-regulating chamber 6. The water thereby takes with it all impurities washed out of the cleaning device 4. The water and the impurities flow around the fluid filter 15 such that the water and the impurities are subsequently again located in the water level-regulating chamber 6.

The washing-out/centrifuging chamber 5 is now largely dry, and the cleaning device 4 may be centrifuged if placed on the receptacle 27.

Figure 3:
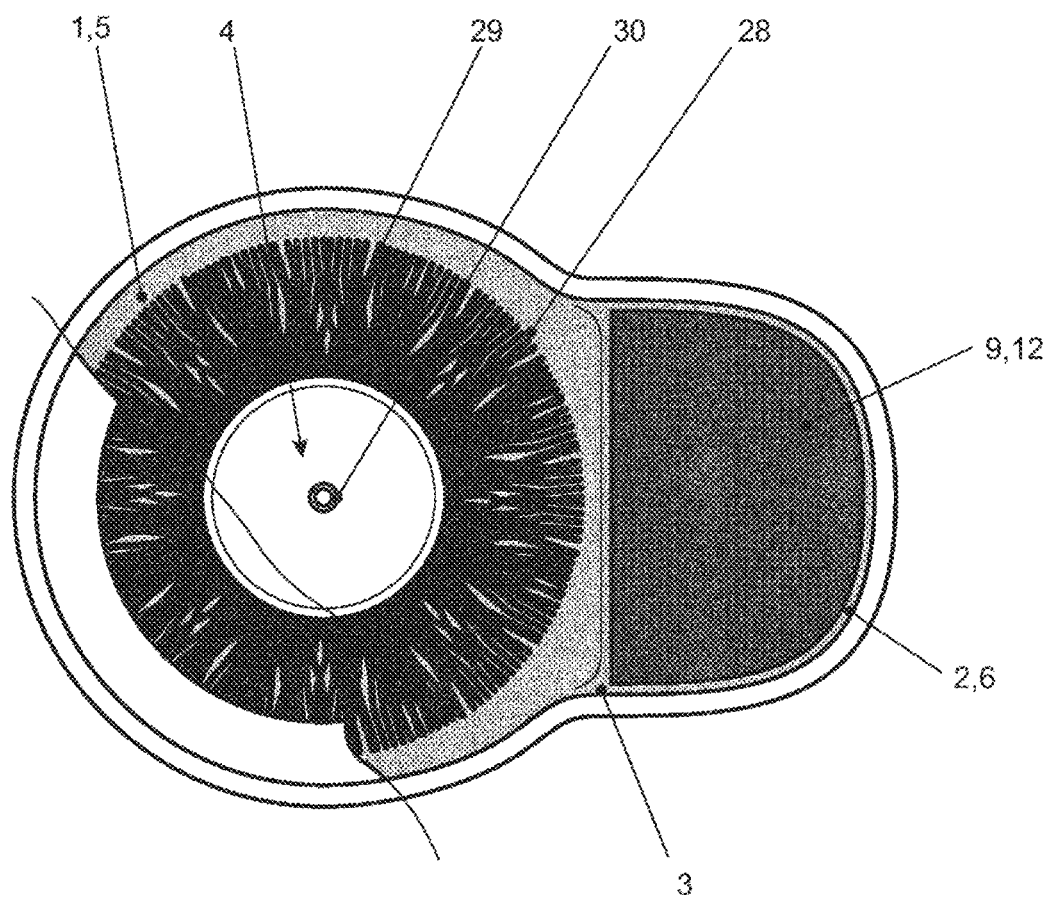
FIG. 3 shows the exemplary embodiment from FIGS. 1 and 2 in plan view.

FIG. 3 shows a plan view of the cleaning system from FIGS. 1 and 2. It can be seen that the washing-out/centrifuging chamber 5 and the water level-regulating chamber 6 are arranged side by side.

Figure 4:
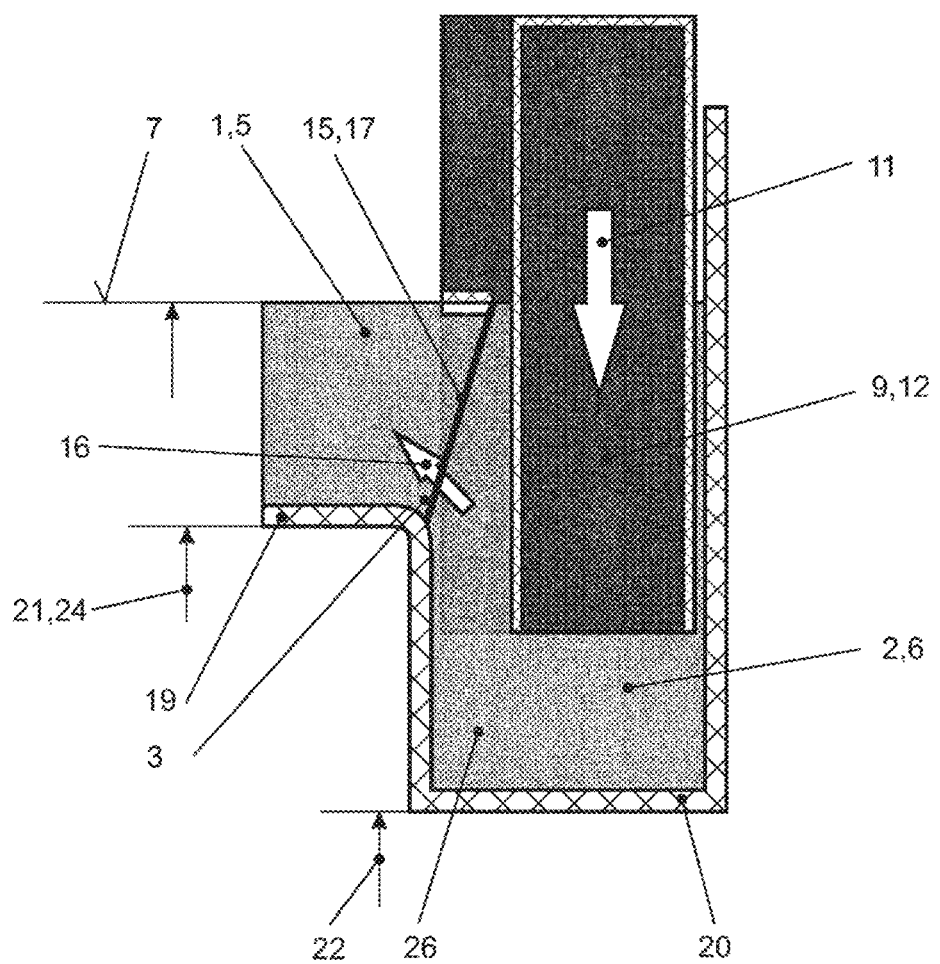
FIG. 4 shows as a cutout, the water level-regulating chamber and the overflow channel with a flap designed as a fluid filter, wherein the displacement body is in a downward movement.

Shown in FIG. 4 is a cutout from the cleaning system FIGS. 1 and 2, around the fluid filter 15.

The fluid filter 15 is arranged in a flap 17 that is arranged so as to be pivotable in the overflow channel 3, wherein the flap 17 is formed by the fluid filter 15.

In FIG. 4 it is shown that the flow can pass through fluid filter 15 only from the water level-regulating chamber 6 to the washing-out/centrifuging chamber 5, in the flow direction 16.

For this purpose, the fluid filter 15 designed as a flap 17 seals the overflow channel 3. Given downward movement 11 of the displacement body 9, the water located in the water level-regulating chamber 6 may only pass through the fluid filter 15 into the adjacent washing-out/centrifuging chamber 5.

The flap can be moved either automatically due to the flow conditions in the overflow channel 3 or via the second actuating device 18, which, in the exemplary embodiment shown here, is functionally coupled to the first actuating device 8 and is therefore compelled to move.

The contaminated liquid located in the water level-regulating chamber 6 is filtered upon flowing through the fluid filter 15. Substantially clean water thereby arrives in the washing-out/centrifuging chamber 5.

The fluid filter may comprise hollow fibers that have a particularly good cleaning/filtering effect.

Figure 5:
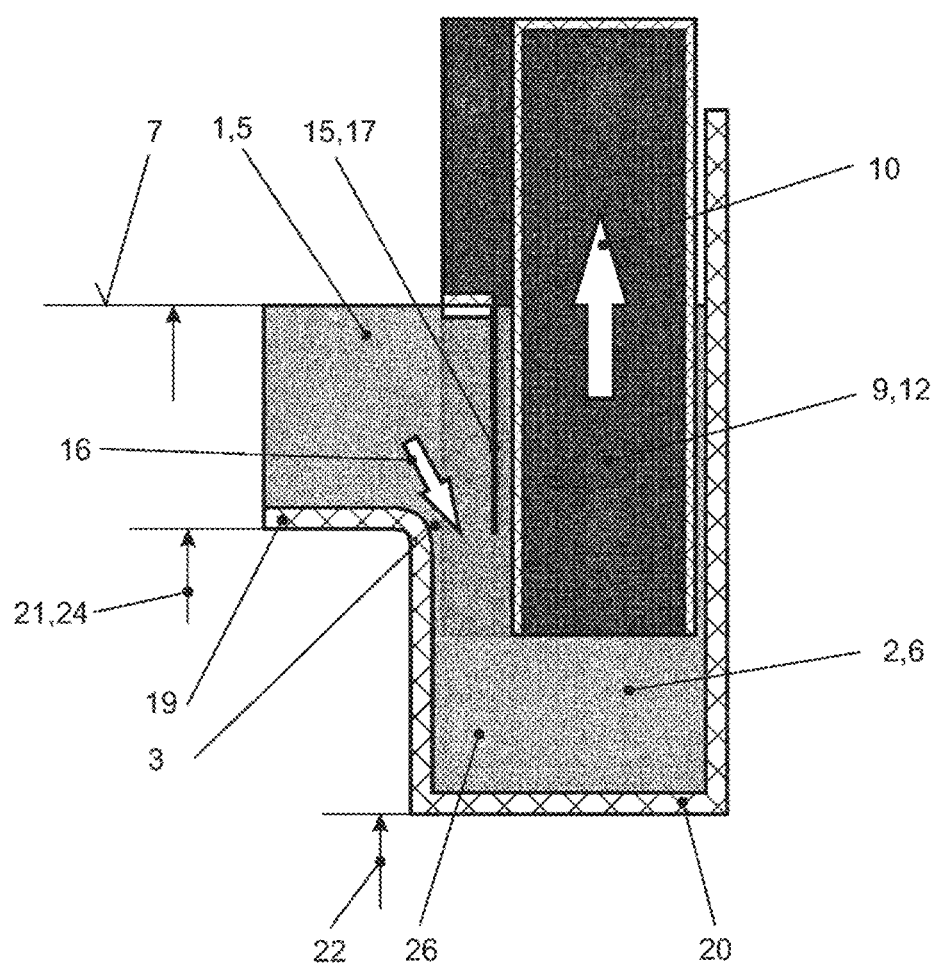
FIG. 5 shows the cutout from FIG. 4, wherein the displacement body is in an upward movement.

Shown in FIG. 5 is the operating state given which the displacement body 9 moves upward 10 in the water level-regulating chamber 6. Meanwhile, the flap 17 designed as a fluid filter 15 opens the overflow channel 3, and the water contaminated by the washing out of the cleaning device 4 flows unhindered from the washing-out/centrifuging chamber 5, past the opened flap 17, into the water level-regulating chamber 6.

At the end of the downward movement 11 of the displacement body 9 from FIG. 4, the operating state shown in FIG. 1 is present.

At the end of the upward movement 10 of the displacement body 9 from FIG. 5, the operating state shown in FIG. 2 is present.

In FIGS. 6 and 7, a further exemplary embodiment of a cleaning system is shown which differs from the previously described cleaning system essentially due to the embodiment of the displacement body 9 and its actuating device 8.

The displacement body 9 has a variable displacement volume 13 which is connected in terms of flow to the water level-regulating chamber 6 and is variable in terms of volume via actuation of an evacuation device 14 similar to a bellows.

In the exemplary embodiment shown here, the first actuating device 8 is designed as an evacuation device 14 and, as described above, is likewise arranged in the installation space 23 of the bucket.

Shown in FIG. 6 is an operating state of the cleaning system, similar to the operating state from FIG. 1.

By actuating the evacuation device 14, the liquid previously arranged in the displacement body 9 is displaced from it. The water level 7 in the water level-regulating chamber 6 and the water level 7 in the washing-out/centrifuging chamber 5 are of essentially matching height, due to the liquid-conducting connection of the overflow channel 3. The cleaning device 4 can be washed out.

In FIG. 7, the cleaning system for centrifuging the cleaning device 4 is prepared.

The liquid previously displaced from the displacement body 9 is now back in it again, and the washing-out/centrifuging chamber 5 is thereby essentially drained.

The embodiment and function of the fluid filter 15 and the stepped shape of the bucket do not differ from the cleaning system shown in FIGS. 1 to 5.

In both exemplary embodiments in accordance with FIGS. 1 to 7, the second floor 20 forms a component of the contact area 25 of the bucket, the volume of water moved in the bucket is approximately 4 to 5 liters, and the water level 7 in the washing-out/centrifuging chamber 5, during the intended use of the bucket, amounts to 0 to 80 mm above the first floor 19.

The handling of the cleaning system in accordance with the invention and the bucket in accordance with the invention is particularly simple for the user, because the cleaning device 4 can either be washed out or centrifuged in one and the same first chamber 1. For this purpose, the water level 7 is correspondingly adapted by actuating the displacement body 9.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A bucket, comprising:
   at least two chambers which are flow connected to one another by at least one overflow channel,
   wherein one of the chambers comprises a combined washing-out/centrifuging chamber for a cleaning device,
   wherein one of the chambers comprises a water level-regulating chamber configured to regulate a water level in the washing-out/centrifuging chamber,
   wherein the water level-regulating chamber contains a displacement body which is movable by a first actuating device, and
   wherein the displacement body is movable up and down via the first actuating device.

2. The bucket according to claim 1, wherein the washing-out/centrifuging chamber and the water level-regulating chamber are arranged essentially side by side, as viewed in a plan view of the bucket.

3. The bucket according to claim 1, wherein the displacement body comprises a hollow body.

4. The bucket according to claim 1, wherein the displacement body has a bell shape.

5. The bucket according to claim 1, further comprising a fluid filter arranged in the at least one overflow channel.

6. The bucket according to claim 5, wherein the bucket is configured to permit a flow to pass in only one flow direction through the fluid filter, from the water level-regulating chamber to the washing-out/centrifuging chamber.

7. The bucket according to claim 5, wherein the fluid filter comprises a check valve.

8. The bucket according to claim 5, wherein the fluid filter is arranged in a flap arranged so as to be pivotable in the at least one overflow channel.

9. The bucket according to claim 8, wherein the flap is movable automatically due to flow conditions in the at least one overflow channel.

10. The bucket according to claim 8, wherein the flap is actuatable by a second actuating device.

11. The bucket according to claim 10, wherein the first actuating device and the second actuating device are functionally coupled and are actuatable simultaneously.

12. The bucket according to claim 1, wherein the washing-out/centrifuging chamber comprises a first floor and the water level-regulating chamber comprises a second floor,
    wherein the first and second floors are arranged at different heights in the bucket, and
    wherein the first floor is arranged above the second floor.

13. The bucket according to claim 12, wherein the first and second floors are arranged offset relative to one another in a stepped manner, if viewing the bucket in section.

14. The bucket according to claim 12, wherein an installation space is arranged below the first floor, and
    wherein at least the first actuating device is arranged in the installation space.

15. The bucket according to claim 12, wherein the first floor is arranged essentially at half a height of the bucket.

16. The bucket according to claim 12, wherein the second floor forms a component of a contact area of the bucket.

17. The bucket according to claim 1, wherein a volume of water moved in the bucket is from 2 to 5 liters.

18. The bucket according to claim 12, wherein the water level in the washing-out/centrifuging chamber during intended use of the bucket is 0 to 80 mm above the first floor.

19. The bucket according to claim 1, wherein, during intended use of the bucket, the water level is 0 mm if the displacement body is not actuated by the first actuating device and at most 80 mm if the displacement body is actuated by the first actuating device.

20. The bucket according to claim 1, further comprising a receptacle for the cleaning device for washing out or centrifuging the cleaning device arranged in the washing-out/centrifuging chamber.

21. A cleaning system, comprising:
the bucket according to claim 1; and
a cleaning device.

22. A bucket, comprising:
at least two chambers which are flow connected to one another by at least one overflow channel; and
a fluid filter arranged in the at least one overflow channel,
wherein one of the chambers comprises a combined washing-out/centrifuging chamber for a cleaning device,
wherein one of the chambers comprises a water level-regulating chamber configured to regulate a water level in the washing-out/centrifuging chamber, and
wherein the water level-regulating chamber contains a displacement body which is movable by a first actuating device.

* * * * *